Dec. 3, 1946.　　　R. M. MERO ET AL　　　2,412,166
MACHINE FOR ELECTRIC WELDING CAN BODIES
Filed Sept. 4, 1943　　　7 Sheets-Sheet 1

Inventors
Ralph M. Mero
Alfred Treff

By Mason, Porter & Diller
Attorneys

Patented Dec. 3, 1946

2,412,166

UNITED STATES PATENT OFFICE 2,412,166

MACHINE FOR ELECTRIC WELDING CAN BODIES

Ralph M. Mero and Alfred Treff, Chicago, Ill., assignors to Continental Can Company, Inc., New York, N. Y., a corporation of New York Application September 4, 1943, Serial No. 501,312

7 Claims. (Cl. 219—6)

The invention relates to new and useful improvements in machines for welding can bodies, and more particularly a machine for spot welding a lap portion of the side seam of the can body.

In the patent granted Nelson Troyer August 12, 1930, No. 1,772,820, there is disclosed a lock and lap seam bodymaker wherein the body blanks after they are notched and provided with hooks are bent around a horn and the hooks are interlocked and bumped. The present invention has to do with a welding device for spot welding one or both of the lap portions of the side seam immediately after the can body is formed around the horn and the side seam bumped.

An object of the invention is to provide a can body spot welding machine wherein during welding both electrodes contact with the can body on the outside thereof and in the area of the lap portions.

A further object of the invention is to provide a machine of the above type with a time-actuated main switch for supplying current to the electrodes after they have been properly positioned for welding, and wherein an independent switch in series with the main switch cuts off the supply of current to the electrodes, if there is no can body to be welded.

A further object of the invention is to provide a welding machine of the above type with a means for stopping the machine, provided that the hooks of the can body are not properly engaged so that the edge portions of the body blank are separated, exposing the horn to contact by the electrodes.

A still further object of the invention is to provide a welding unit for a machine of the above type wherein the current supplying electrode is in the form of a solid head having a relatively large surface shaped to conform to the can body.

A still further object of the invention is to provide a welding unit of the above type wherein the cooperating electrode is in the form of a disk making point contact with the face of the outer lap section of the seam, and wherein said disk is shifted on its axis each time that the electrode is retracted from contact with the can body.

These and other objects will in part be obvious and will in part be more fully disclosed.

In the drawings which show by way of illustration one embodiment of the invention, Figure 1 is a view partly diagrammatic, partly in section and partly in side elevation showing the bumping mechanism, the horn extension, a support therefor and the welding unit for spot welding the lap sections.

Figure 1:
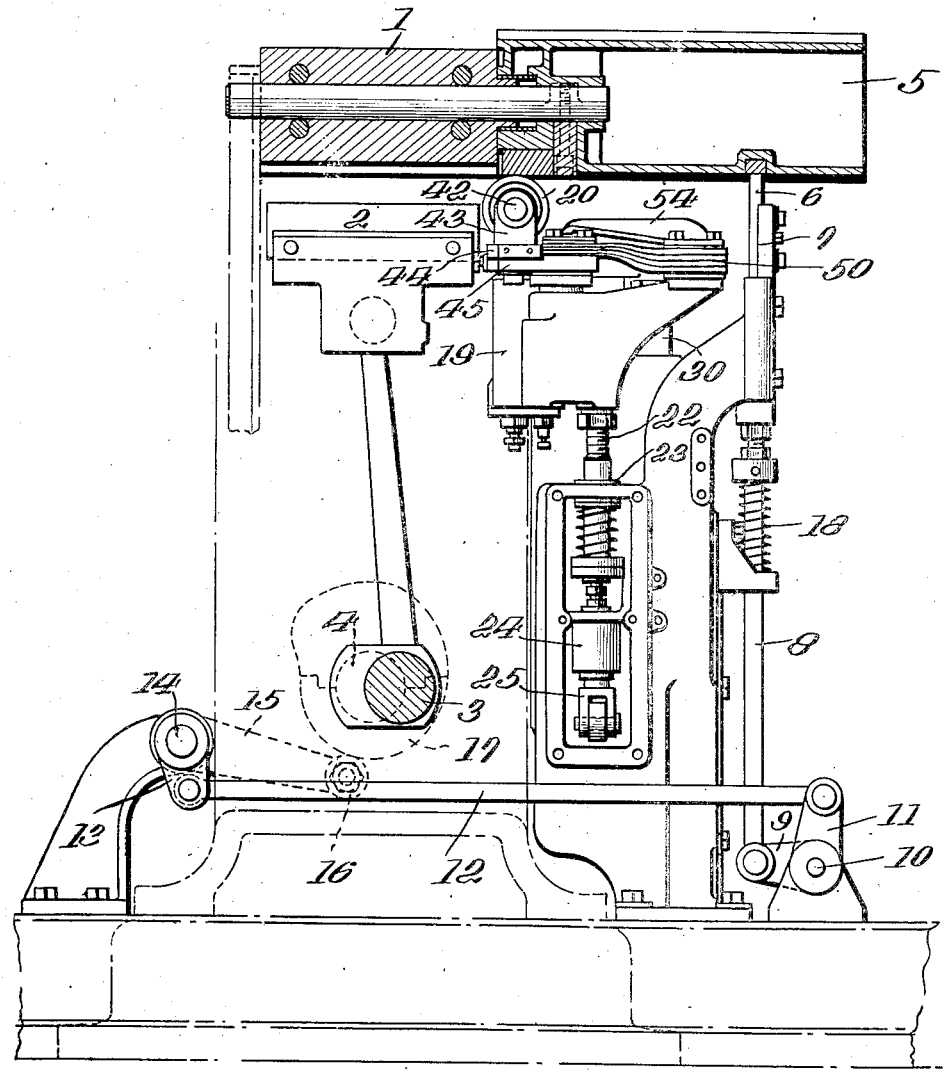

In illustrating the invention only a very small portion of the bodymaker is shown. Reference may be had to the Troyer patent as illustrating the type of bodymaker to which the invention is applied.

The can body blank after it is notched and provided with hooks is formed over a horn, the hooks interlocked and then bumped. The horn for supporting the can body during bumping is provided with an extension onto which the can body is moved by the ordinary feeding mechanism of the bodymaker.

Associated with this horn extension are gauges for positioning the can body for the spot welding of the lap section at one end of the can body. This end where the lap is spot welded is the end which is flanged and left open until the container is filled, after which the end is seamed thereto for closing the container. Also associated with the horn extension is a supporting means which contacts with the extension for supporting the same, and this supporting means is momentarily retracted from engagement with the extension to allow the can body to be fed off from the horn after the welding operation is completed.

The welding unit is positioned beneath the horn extension and includes two electrodes. One is in the form of a relatively large head, which is shaped to conform to the contour of the can body. This electrode is mounted on a cross head which is reciprocated to bring the electrodes into contact with the can body. The other electrode is in the form of a disk, and it is mounted beside the first-named electrode and positioned so as to contact with the undersurface of the outer lap of the side seam. This rotating disk is also mounted on the cross head, and means is provided for shifting the disk through short increments of angular movement each time the cross head is retracted. Both electrodes contact with the outside of the can body. The disk makes point contact with the outer lap section and the enlarged electrode head makes contact with the can body supporting the inner-lap section and adjacent the end of the lap section. Also associated with the welding machine is a time-actuated switch for supplying current to electrodes after they have contacted with the can body and also an independent switch which is controlled by the can body so that the circuit normally remains open and is only closed when there is a can body on the horn extension for welding. Also associated with the welding machine is a device which is normally inactive, but which is contacted with by the can body provided the can hooks are not engaged and the side edges of the body blank are separated. This device automatically stops the machine so as to prevent a supply of current to the electrodes when the lap sections are not properly positioned for spot welding.

Referring more in detail to the drawings, the forming horn of the bodymaker is illustrated at 1. The framework supporting the same is diagrammatically shown and is similar to that disclosed in the Troyer patent supra. The bumping iron is indicated at 2. This bumping iron is operated by an eccentric 3 on an actuating shaft 4.

Mounted on this horn is a horn extension 5. Said horn extension is secured to the end of the horn in any suitable way so that the extension is a rigid part of the horn around which the can body is formed and bumped. The horn extension is provided with grooves corresponding to the grooves in the bumping horn so that the feed bars of the feeding mechanism illustrated in the patent may be extended so as to intermittently feed the body blank onto the bumping horn and after the side edges have been joined and bumped, then the body thus formed is moved by the feed bar onto the extension of the horn and in position for welding. After welding, the feeding mechanism will move the welded formed body off of the horn extension and into engagement with the usual conveyor for feeding the can body to the soldering mechanism for the soldering of the side seam.

Associated with the horn extension is an auxiliary supporting means which is in the form of a plate 6. This plate 6 is carried by a cross head 7 which is reciprocated by a rod 8 attached to a rocker arm 9 on a shaft 10. Another rocker arm 11 on the shaft 10 is connected by a link 12 to an arm 13 on a shaft 14. This shaft 14 carries an arm 15 shown in dotted lines in Fig. 1. The arm 15 carries a roller 16 cooperating with a cam 17 on the shaft 4. There is a spring 18 which normally raises the cross head so as to bring the plate 6 into engagement with the horn extension for supporting the same and the cam 17 operates to retract this support momentarily so as to allow the can body to pass off from the horn extension. The plate 6 contacts with the horn extension beyond the position of the can body during the welding of the same.

The welding unit includes a supporting head 19 on which both of the welding electrodes 20 and 21 are mounted. This supporting head 19 is adjustably connected to the upper end of a rod 22. This rod 22 is guided in bearings 23, 24 attached to the frame. The lower end of the rod contacts with an abutment on the lever arm 25 which is pivotally supported on a shaft 26. The lever arm 25 carries a roller 27 which bears on a cam 28. A spring 29 moves the rod and the supporting head 19 downward, holding the roller in contact with the cam 28. This cam 28 is mounted on a shaft 29.

Figure 5:
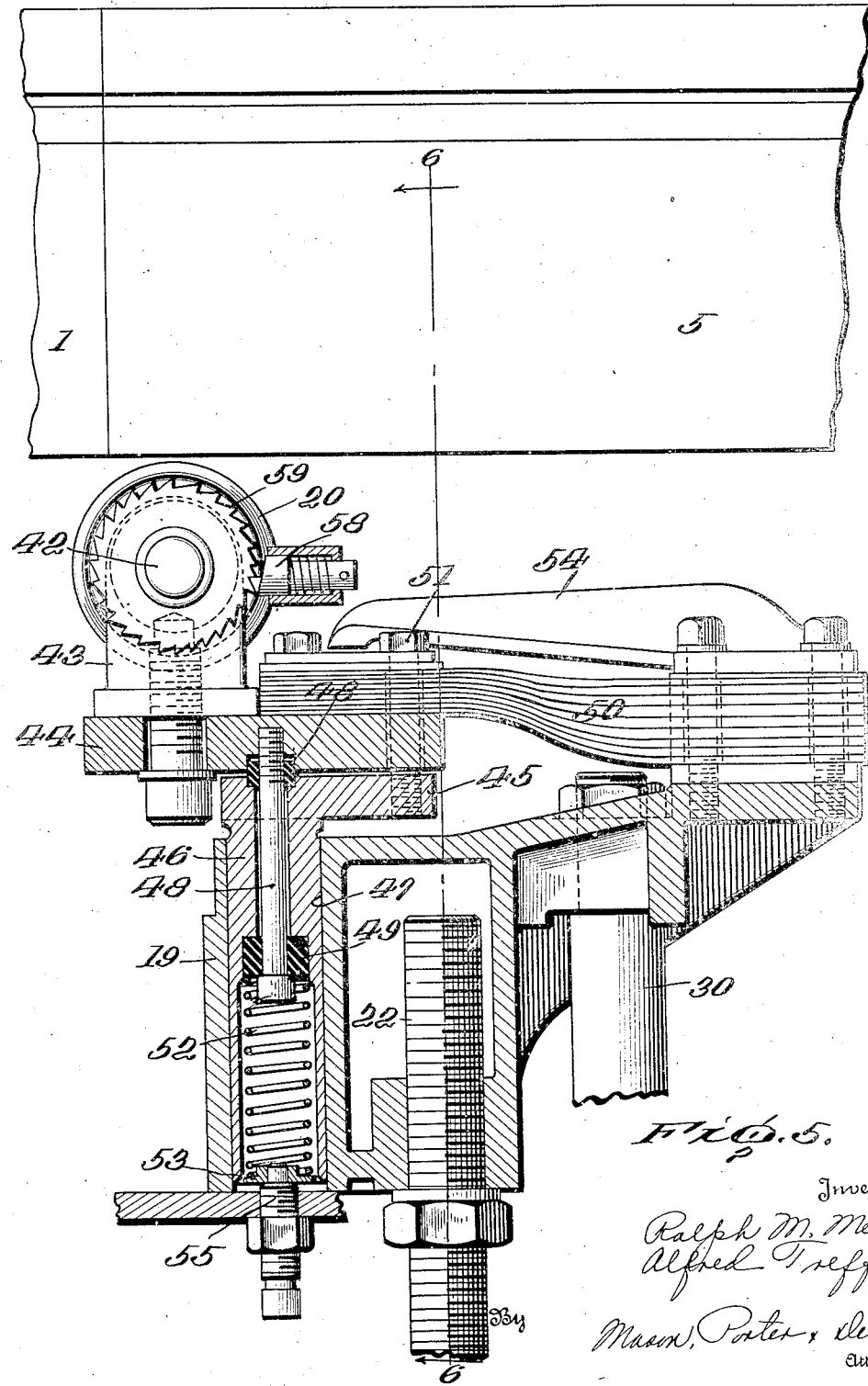
Figure 5 is a view partly in vertical section on the line 5—5 of Figure 4, and partly in side elevation showing the disk electrode and the manner of yieldingly supporting the same.
Figure 6:
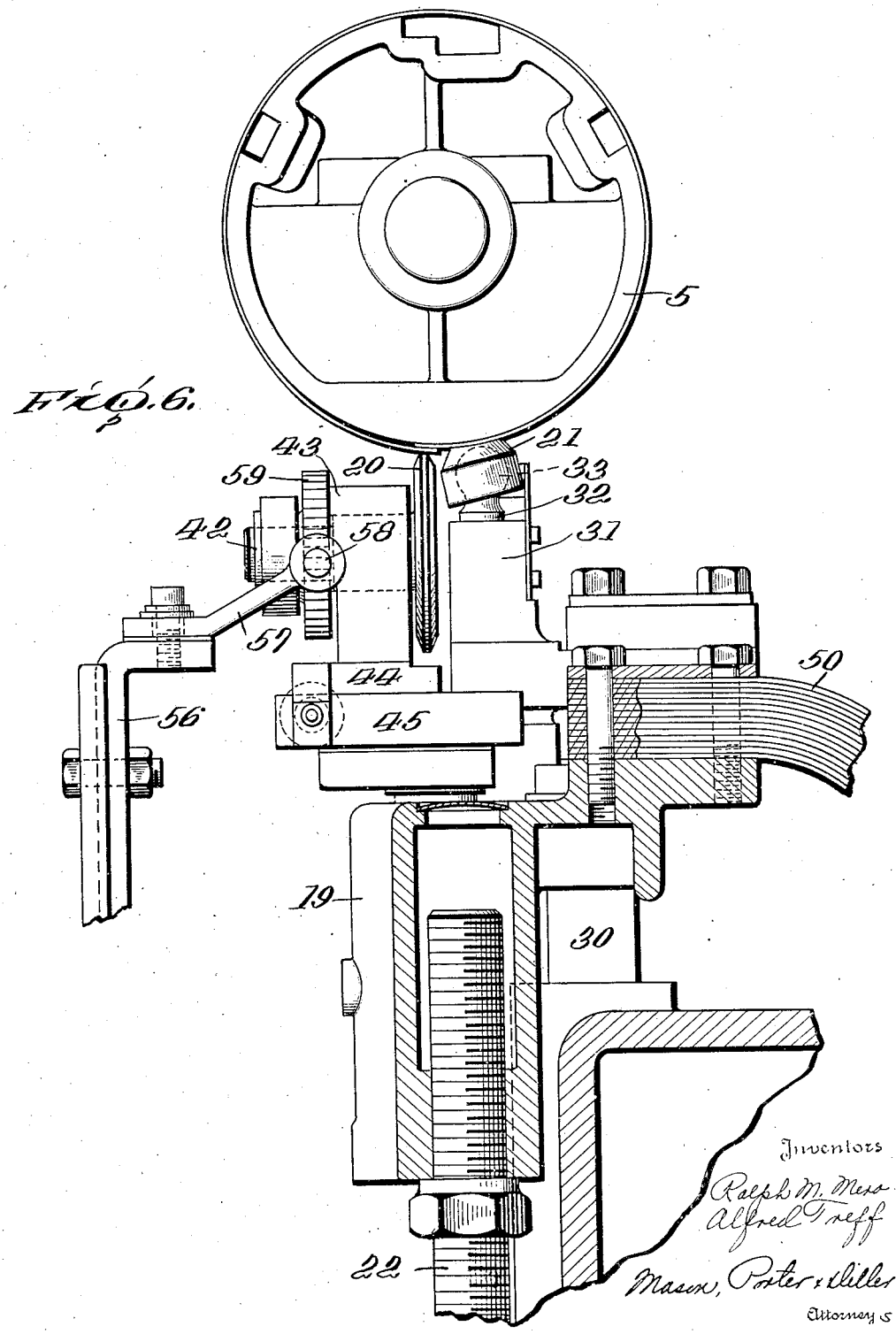
Figure 6 is a view partly in vertical section and partly in end elevation, the section being taken on the line 6—6 of Figure 5.
Figure 7:
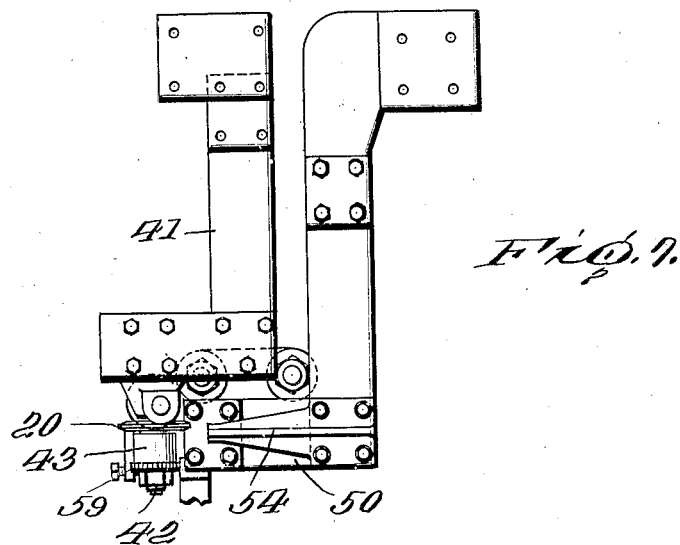
Figure 7 is a plan view showing more or less diagrammatically the welding units and the leads directing current thereto.
Figure 8:
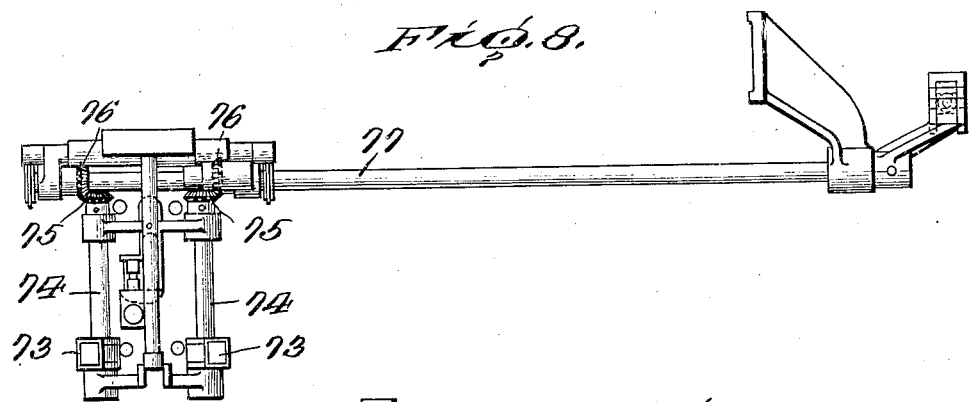
Figure 8 is a plan view of the gauges and the operating mechanism therefor.

Attached to the supporting head 19 is a guide rod 30 which is guided in the frame of the machine, see Figures 1 and 6. The means for supporting the electrodes for independent movement on the supporting head 19 is shown in detail in Figures 4 and 5. The electrode 21 is carried by a supporting member 31. Said supporting member is provided with a stem 32 carrying a ball head 33, which fits in a socket in the electrode 21 so that the enlarged electrode head 21 has a universal movement on said ball head 30. The face of this welding unit is shaped to conform to the can body. Therefore the face is curved slightly so that it will have a relatively wide contact with the can body, as clearly shown in Figure 4. This electrode contacts with the body of the can at one side of the lap section and supplies current to the can body during the welding operation. The supporting head 19 is provided with a cylindrical pocket. The supporting member 31 is provided with a sleeve 34 which slides in the pocket.

Attached to the support 31 is a rod 35 which extends down through the bottom of the pocket in the supporting head 19. There is a sleeve 36 threaded on to this rod, and on the upper end of the sleeve is an abutment plate 37. A spring 38 bears at one end on this abutment plate and at the other end against the support 31 so that the spring normally tends to raise the support or rather yieldingly hold the support in its raised position. There is a nut 39 threaded onto the rod 35 which limits the upward movement of the support through contact with this sleeve 36. The sleeve 36 may be adjusted and secured in adjusted position by a lock nut 40. The supporting head is raised positively by the actuating cam 28 therefor, but the electrode 21 is yieldingly held in this raised position so that it may yield to conform to the thickness of the metal with which it contacts. Current is supplied to this electrode from a lead 41 which is connected to the transformer indicated at T in Figure 2. This lead in the form of a flexible conductor permits the supporting head to move up and down through a sufficient distance to permit the placing of the can body for welding and the removal of the can body after it is welded.

Figure 2:
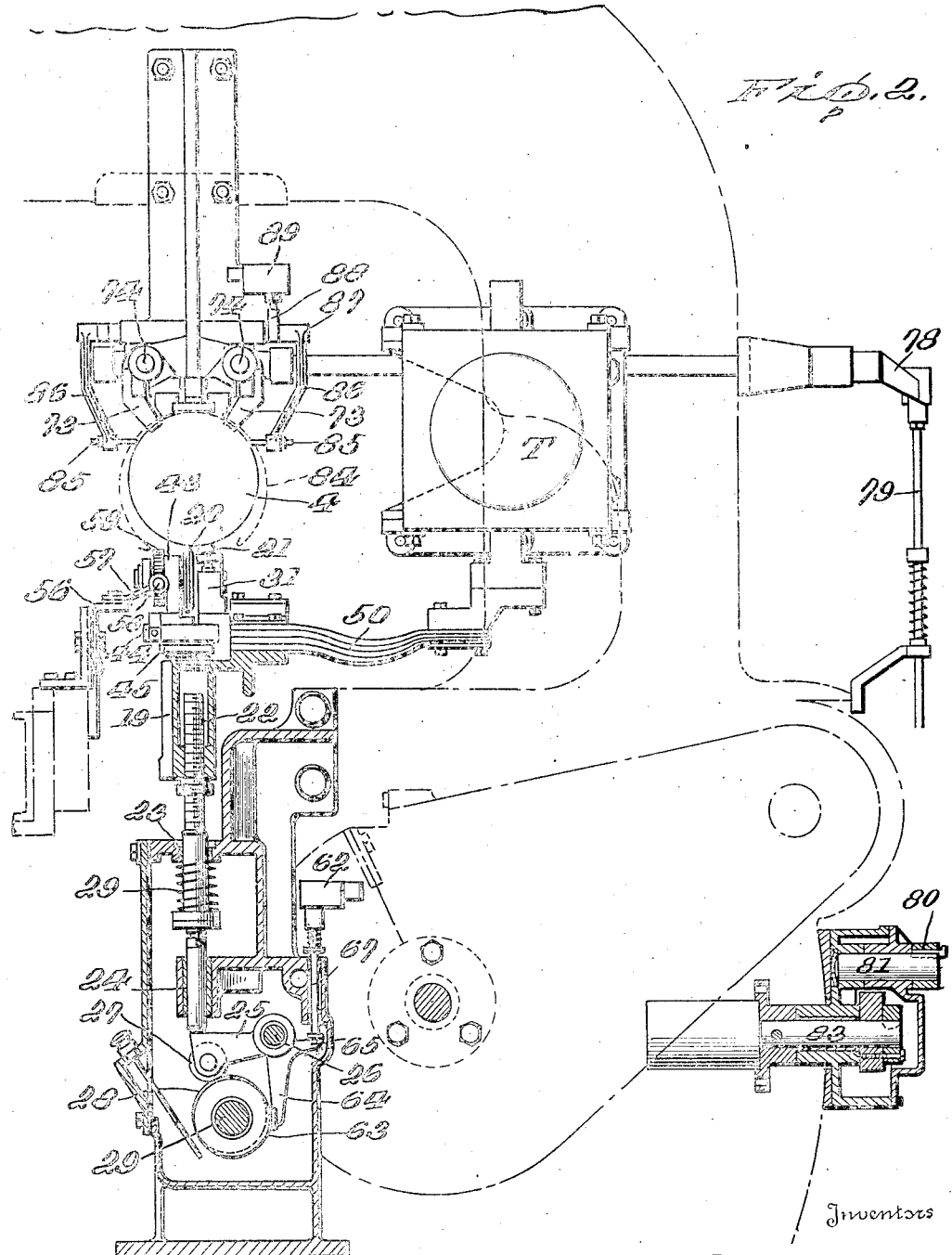
Figure 2 is a view partly diagrammatic, partly in section and partly in end elevation showing the horn, the supporting frame, the welding unit, the gauges for positioning the can body for welding, the means for stopping the machine if the hooks are not properly engaged, the transformer and one of the leads to the welding unit.

The electrode 20 as noted above, is in the form of a disk which is fixed to a shaft 42. The shaft 42 is mounted for rotation in a bracket 43 which is mounted on a support 44. The support 44 is carried by a plate 45, see Figure 5. The plate 45 has a depending stem 46 which is mounted for endwise movement in a cylindrical pocket 47 formed in the supporting head 19. The support 44 is insulated from the plate 45 and the depending member carried thereby. There is a bolt 43 which extends up through an opening in the plate 45 and the plate extension. This bolt is threaded into the support 44. There are washers of insulating material 48 and 49 through which the bolt passes. The support 44 and the plate 45 are spaced from each other. A lead 50 connected to the support 19 but insulated therefrom is also connected to the transformer T, as indicated in Figure 2. This lead 50 is attached firmly to the support 44 and through the bracket and supporting shaft supplies current to the electrode disk 20. One of the bolts 51 for attaching the lead to the support 44 also connects the support 44 to the plate 45, and this bolt connection is properly insulated so that no current passes from the support 44 to the plate 45.

A spring 52 bears against a washer plate 53 at one end and against the insulation 49 at its other end. This spring tends to raise the plate 45 and the electrode. There is a bracket arm 54 located just above the connection of the lead 50 with the support 44 which limits the upward movement of the support 44. The spring will normally hold the support 44 in its raised position, and when the disk electrode contacts with the metal, it can yield by compressing the spring 52. The tension on the spring 52 can be varied by shifting the sleeve 55 which supports the washer plate 53.

Mounted on a bracket 56 is an arm 57 provided with a dog 58 which is yieldingly pressed into engagement with a ratchet wheel 59 mounted on the shaft carrying the electrode disk 20. This bracket arm is so positioned that when the supporting head 19 is lowered, the dog 58 will turn the ratchet wheel and electrode disk through a short angular movement. When the supporting head is raised, then the dog will yield and pass over the ratchet teeth in the usual manner.

Figure 4:
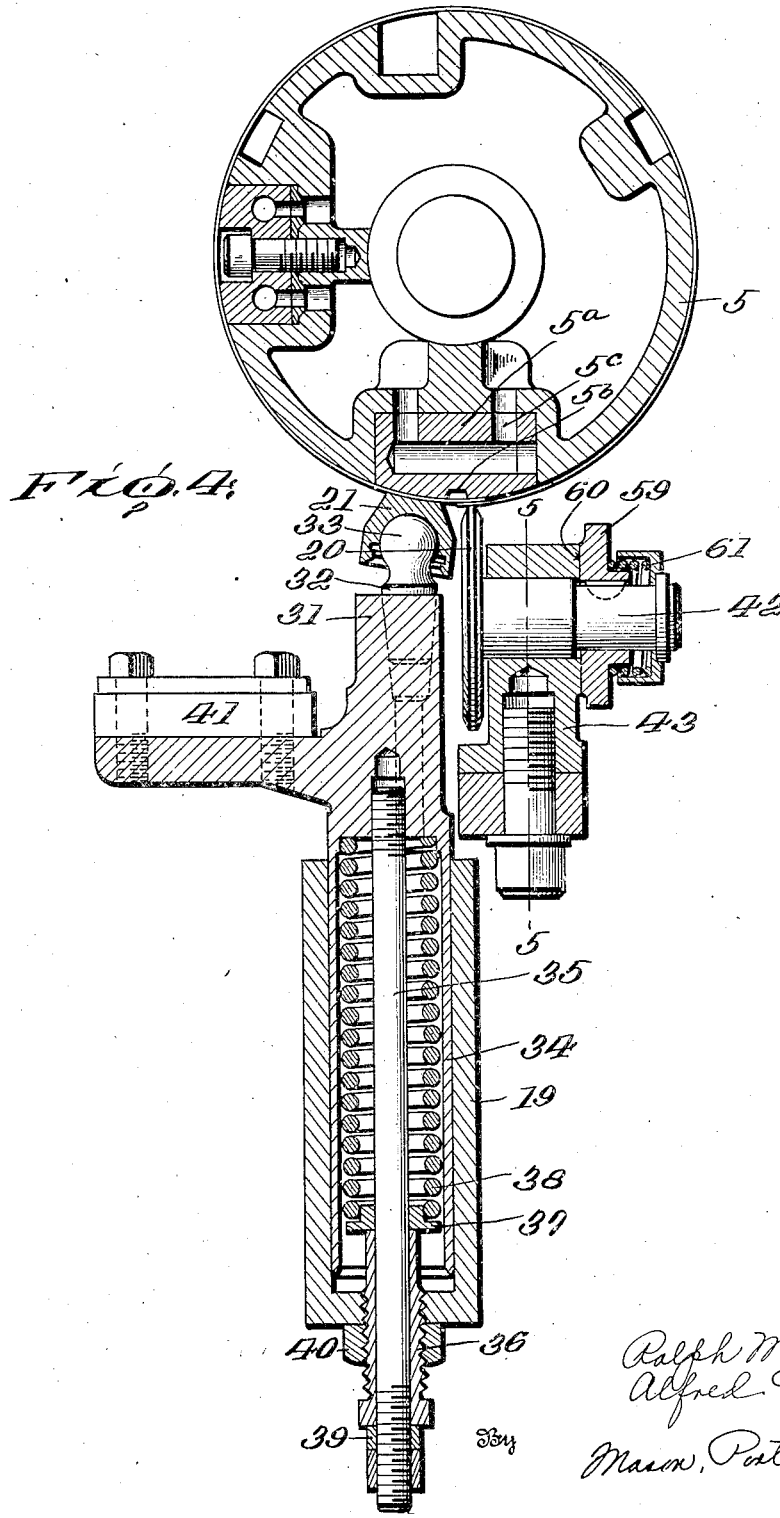
Figure 4 is an enlarged detail in vertical section through the horn and the welding unit showing the electrodes in contact with the can body, said section illustrating the yielding means for supporting the welding electrode having the relatively large head shaped to conform with the can body.

As clearly shown in Figure 4, the ratchet wheel 59 makes frictional engagement at 60 with the supporting bracket for the electrode disk 20. A spring 61 normally presses the ratchet wheel into engagement with the bracket. The ratchet wheel is keyed to the shaft supporting the electrode disk. The purpose of this frictional engagement between the ratchet wheel and the bracket is to insure a supply of current to the electrode from the bracket 43, supporting plate 44 and lead 50.

The horn extension 5 is provided with a metal shoe 5a on the under side thereof, and there is a groove in this shoe, indicated at 5b. There is no current supplied to this member in the horn. The current is preferably supplied to the electrode 21 and passes through the metal parts of the can body to the electrode 20. This metal shoe can be readily removed and replaced whenever desired. It is also preferably provided with suitable channels 5c through which cooling fluid may be passed for preventing overheating of the shoe.

The flow of current from the transformer to the welding electrodes is controlled by a cam-actuated switch, indicated at 62 in Figure 2 of the drawings. The cam for closing the switch is shown at 63. This cam is mounted on the shaft 29. A lever 64 pivoted on the shaft 26 is held in contact with the cam. This lever is provided with an arm 65 which engages the rod 67 that contacts with the member of the switch for controlling the same. This cam 63 is so constructed and timed that when the can body is in proper position for welding the laps of the side seam the switch 62 is closed and this will cause the current to pass to the electrodes.

Figure 9:
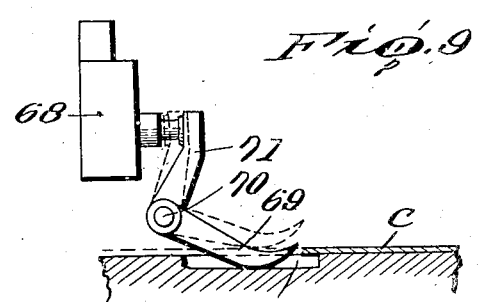
Figure 9 is a detail showing in full lines the current cut-out means positioned for opening the circuit and in broken lines the means positioned by the can body passing beneath the same for closing the current.

There is another switch 68 in the circuit leading to the electrodes which is normally open. Associated with this switch 68 is an arm 69 pivotally mounted on a shaft 70. Also mounted on the shaft 70 is an arm 71 which controls the switch 68. When there is no can body on the horn extension the arm 69 drops into the recess 72 in the horn and this permits the switch to open. When a can body indicated at C passes along the horn it will contact with the upturned curved end of the arm 69 and raise the same to the dotted line position in Figure 9. This closes the switch. When a can body is moved along the horn and underneath this arm to a position for welding, it will close the switch 68 so that when the main switch 62 is closed, current will flow from the transformer to the electrodes. If, however, there is no can body fed on to the horn extension for welding, then this switch 68 remains open and the closing of the switch 62 is ineffective to cause any current to flow to the electrodes.

Figure 3:
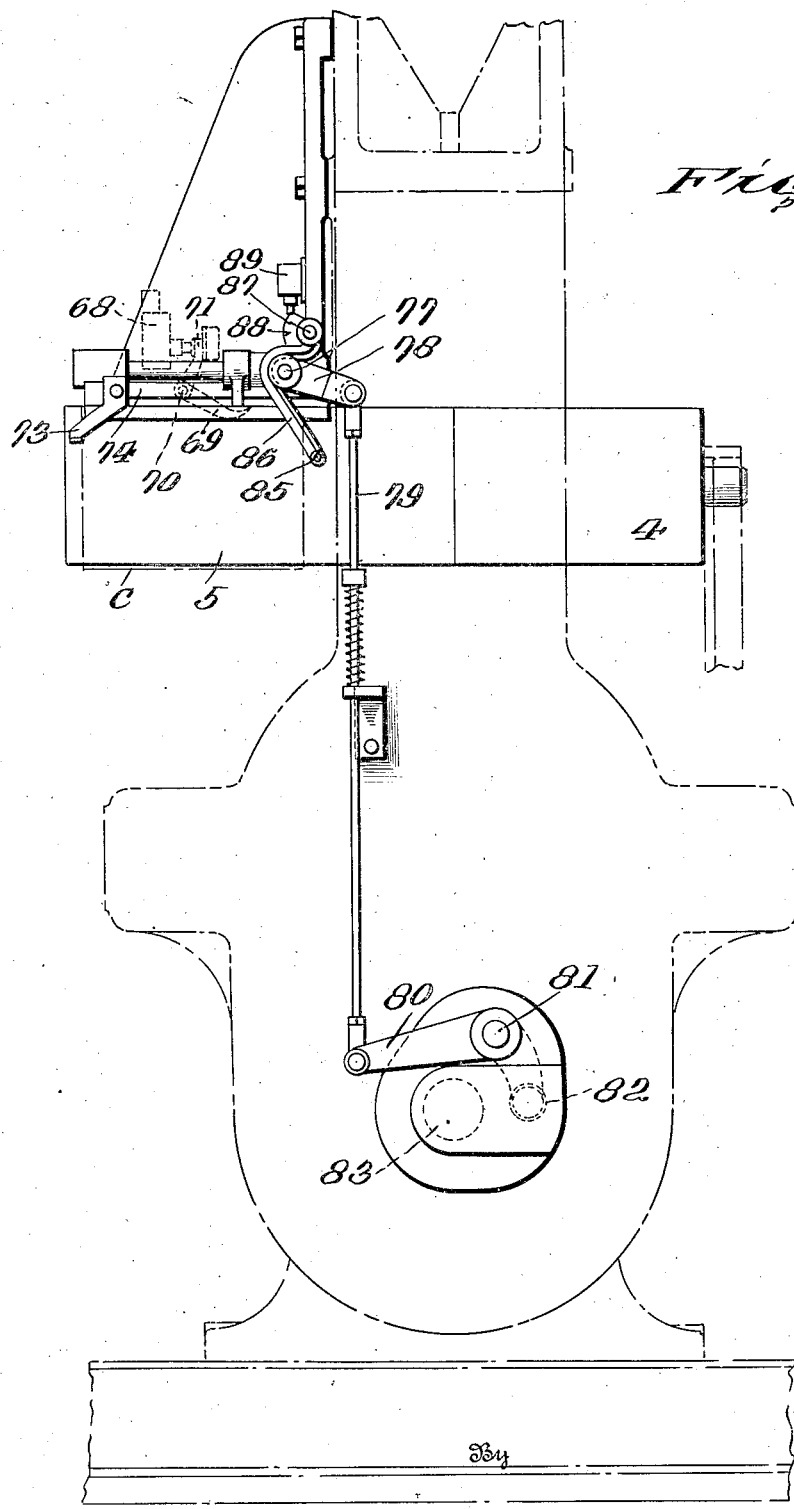
Figure 3 is a view partly diagrammatic, showing the gauges, the stop mechanism, the independent current control, and diagrammatically the horn and can to be spot welded.

For positioning the can body for welding, gauges are provided. There are two gauges 73. Each gauge is mounted on a shaft 74 and each shaft 74 carries a gear 75 which mesh respectively with bevel gears 76, 76 on the shaft 77. The shaft 77, as shown in Figure 3, is provided with an arm 78 to which a rod 79 is connected. This rod at its lower end is connected to an arm 80 mounted on a shaft 81. A second arm on said shaft 81 carries a roller 82 cooperating with a cam on the shaft 83. This cam is so shaped and constructed that the gauges are moved down close to the horn extension as shown in Figure 2 so that the can body moved by the feed bar is brought into contact with the gauges. This will accurately position the can body for welding. The cam is also so shaped as to move the gauges from the front of the can body after the welding takes place so that the can body can be moved forward and off from the horn extension.

It sometimes happens that the hooks are not properly engaged and that the can body when moved onto the horn extension has the edges thereof separated, as indicated in broken lines at 84. The lap sections are not in proper position for spot welding. Nevertheless the presence of the can body on the horn extension would close the switch 68 so that the electrodes would be furnished with current. This might damage the horn extension and the electrodes. In order to stop the machine in case the hooks are not properly locked and the edges are separated, the machine is provided with fingers 85, 85 carried by arms 86, 86 mounted on a cross shaft 87. These fingers lie close to the horn extension but sufficiently separated therefrom that a can body moved along the horn with the hooks properly engaged will not contact with the fingers. If, however, the hooks are not engaged and the side portions of the body spring out to the position shown in Figure 2, then the can body will contact with these fingers and swing the arms so as to turn the shaft 87. The shaft 87 carries a cam 88 which controls a switch 89 in the circuit of a main motor operating the machine. When the arms are swung to the left by the passing can body, the cam is rotated in a clockwise direction and will open the switch so as to stop the motor and stop the machine. As soon as the can body passes, the arms will swing back to the position shown in Figure 3 and the switch 89 will close.

It is thought that the operation of the machine will be obvious from the description given above. The can bodies pass one after another from the bumping horn onto the horn extension where the gauges stop the movement of the can body and position the same for spot welding. The actuated parts of the machine are so timed that when the can body is properly positioned for spot welding the supporting head for the welding electrodes moves up and causes the electrodes to contact with the can body. The movement of the can body onto the horn causes the switch 68 to be closed and therefore when the switch 62 is closed by the timed actuating cam therefor, current will be supplied to the electrodes and the spot welding accomplished. As soon as the welding operation is completed, the can body is again picked up by the feed bar, the gauges move out of the way and the can body is discharged from the extension so that it passes on through the soldering mechanism for the solder bonding of the side seam.

It is obvious that many changes may be made in the details of construction without departing from the spirit of the invention as set forth in the appended claims.

We claim:

1. A welding machine comprising a supporting horn for a formed can body having a side seam including interlocking hooks and lapped portions at the end thereof, cooperating welding electrodes disposed at one side of said horn so as to engage the outer face of the can body in the region of the lap portions of the side seam for spot welding the same, a supporting head on which said electrodes are mounted, means for reciprocating said head to cause the electrodes to contact with the can body, one of said electrodes including a rotatable disk, a supporting bracket for said disk, a supporting plate for said bracket, means for connecting the bracket to said supporting plate on said head including insulation so that the bracket is insulated from the supporting plate therefor, yielding means for moving said bracket toward the can body, a stop for limiting the movement of the bracket relative to the supporting plate, and means for supplying current to said bracket and the electrode carried thereby.

2. A welding machine comprising a supporting horn for a formed can body having a side seam including interlocking hooks and lapped portions at the end thereof, cooperating welding electrodes disposed at one side of said horn so as to engage the outer face of the can body in the region of the lap portions of the side seam for spot welding the same, a supporting head on which said electrodes are mounted, means for reciprocating said head to cause the electrodes to contact with the can body, one of said electrodes including a rotatable disk, a supporting bracket for said disk, a supporting plate for said bracket, means for connecting the bracket to said supporting plate on said head including insulation so that the bracket is insulated from the supporting plate therefor, yielding means for moving said bracket toward the can body, a stop for limiting the movement of the bracket relative to the supporting plate, means for supplying current to said bracket and the electrode carried thereby, and means for supporting the disk on said bracket including a shaft, a ratchet wheel keyed to said shaft and yielding means for pressing the ratchet wheel into engagement with the bracket for transferring current from the bracket through the ratchet wheel to the rotating disk.

3. A welding machine comprising a supporting horn for a formed can body having a side seam including interlocking hooks and lapped portions at the end thereof, cooperating welding electrodes disposed at one side of said horn so as to engage the outer face of the can body in the region of the lap portions of the side seam for spot welding the same, a supporting head on which said electrodes are mounted, means for reciprocating said head to cause the electrodes to contact with the can body, the mounting for one of said electrodes including a rotatable disk, a supporting bracket for said disk, a supporting plate for said bracket, means for connecting the bracket to the supporting plate including insulation so that the bracket is insulated from the supporting plate therefor, yielding means for moving said bracket toward the can body, a stop for limiting the movement of the bracket relative to the supporting plate, means for supplying current to said bracket and the electrode carried thereby, means for supporting the disk on said bracket including a supporting shaft, a ratchet wheel attached to said supporting shaft, and a pawl carried by a stationary part of the frame and disposed in the path of the ratchet wheel for turning the ratchet wheel through a short angle of movement each time that the supporting head is moved away from the can body.

4. A welding machine comprising a supporting horn for a formed can body having a side seam including interlocking hooks and lapped portions at the end thereof, cooperating welding electrodes disposed at one side of said horn so as to engage the outer face of the can body in the region of the lap portions of the side seam for spot welding the same, a supporting head for said electrodes, cam means for reciprocating said supporting head in timing with the movements of the can bodies onto and off of the horn, one of said electrodes being shaped to conform to the contour of the can body and adapted to engage the can body at one side of the outer lap portion, the other electrode being a rotatable disk disposed so as to make point contact with said outer lap portion, said electrodes being independently and yieldably carried by said supporting head, said rotatable electrode supporting means being insulated from said supporting head, and means for supplying current to said electrodes.

5. A welding machine comprising a supporting horn for a formed can body having a side seam including interlocking hooks and lapped portions at the end thereof, cooperating welding electrodes disposed at one side of said horn so as to engage the outer face of the can body in the region of the lap portions of the side seam for spot welding the same, a supporting head for said electrodes, means operating in timing with the movement of the can bodies for reciprocating said supporting head, one of said electrodes being a rotatable disk yieldingly carried by said supporting head, the other of said electrodes being relatively large and shaped to conform to the curvature of the can body, a supporting member having a ball head thereon on which said electrode is mounted for universal shifting movement, and means mounted on said supporting head to which said supporting member is rigidly attached, said means including a spring for yieldingly supporting said electrode.

6. A welding machine comprising a supporting horn for a formed can body, cooperating welding electrodes disposed at one side of said horn so as to engage the outer face of the can body in the region of the side seam, means for moving the electrodes into and out of contact with the main body, a current supply for said electrodes, a main switch in the current supply circuit, means for opening and closing said switch in timing with the presentation of can bodies to be welded, an auxiliary switch in series with said main switch which is normally open, and means operated by the can body for closing the auxiliary switch when the can body is positioned for welding.

7. A welding machine comprising a supporting horn for a formed can body having a side seam including interlocking hooks and lap portions at the ends thereof, cooperating welding electrodes disposed at one side of said horn so as to engage the outer face of the can body in the region of the side seam, means for moving the electrodes into and out of contact with the main body, a current supply for said electrodes, a main switch in the current supply circuit, means for opening and closing said switch in timing with the presentation of can bodies to be welded, an auxiliary switch in series with said main switch which is normally open, means operated by the can body for closing the auxiliary switch when the can body is positioned for welding, a switch in the circuit of the motor for operating the machine, and devices adapted to be engaged by a can body before it is positioned for welding when the hooks are disengaged and the side edges of the can body blank are separated for opening said last-named switch to stop the machine.

RALPH M. MERO.
ALFRED TREFF.